United States Patent [19]

Döppling et al.

[11] Patent Number: 4,603,923
[45] Date of Patent: Aug. 5, 1986

[54] INNER RACE FOR A SWASHPLATE MECHANISM

[75] Inventors: Horst Döppling; Steffen Hertrich; Walter Pöschl; Joachim Ritter; Karl Sill, all of Herzogenaurach, Fed. Rep. of Germany

[73] Assignee: INA Walzlager Schaeffler KG, Fed. Rep. of Germany

[21] Appl. No.: 682,603

[22] Filed: Dec. 17, 1984

[30] Foreign Application Priority Data

Jan. 11, 1984 [DE] Fed. Rep. of Germany ....... 3400635

[51] Int. Cl.⁴ ............................................. F16C 31/04
[52] U.S. Cl. ........................................ 384/7; 74/60; 384/20; 384/49
[58] Field of Search .............. 308/3 C, 3 R, 2 R, 6 R; 74/60

[56] References Cited

U.S. PATENT DOCUMENTS

| 790,374 | 5/1905 | Maxwell | 308/3 C |
|---|---|---|---|
| 4,396,357 | 8/1983 | Hartley | 74/60 |
| 4,487,272 | 12/1984 | Bleicher et al. | 74/60 |

Primary Examiner—Lenard A. Footland
Attorney, Agent, or Firm—Bierman, Peroff & Muserlian

[57] ABSTRACT

An inner race for a swashplate mechanism comprising an inner race having on its outer surface a ball groove extending at an angle to its longitudinal axis, and an outer race surrounding the inner race and having a ball groove formed in its bore, and a ring of balls rolling in the grooves of the two races characterized in that the inner race is formed as a tubular sheet-metal element with a ball groove formed therein without metal removal and having a hub bush in its bore to receive a shaft.

10 Claims, 6 Drawing Figures

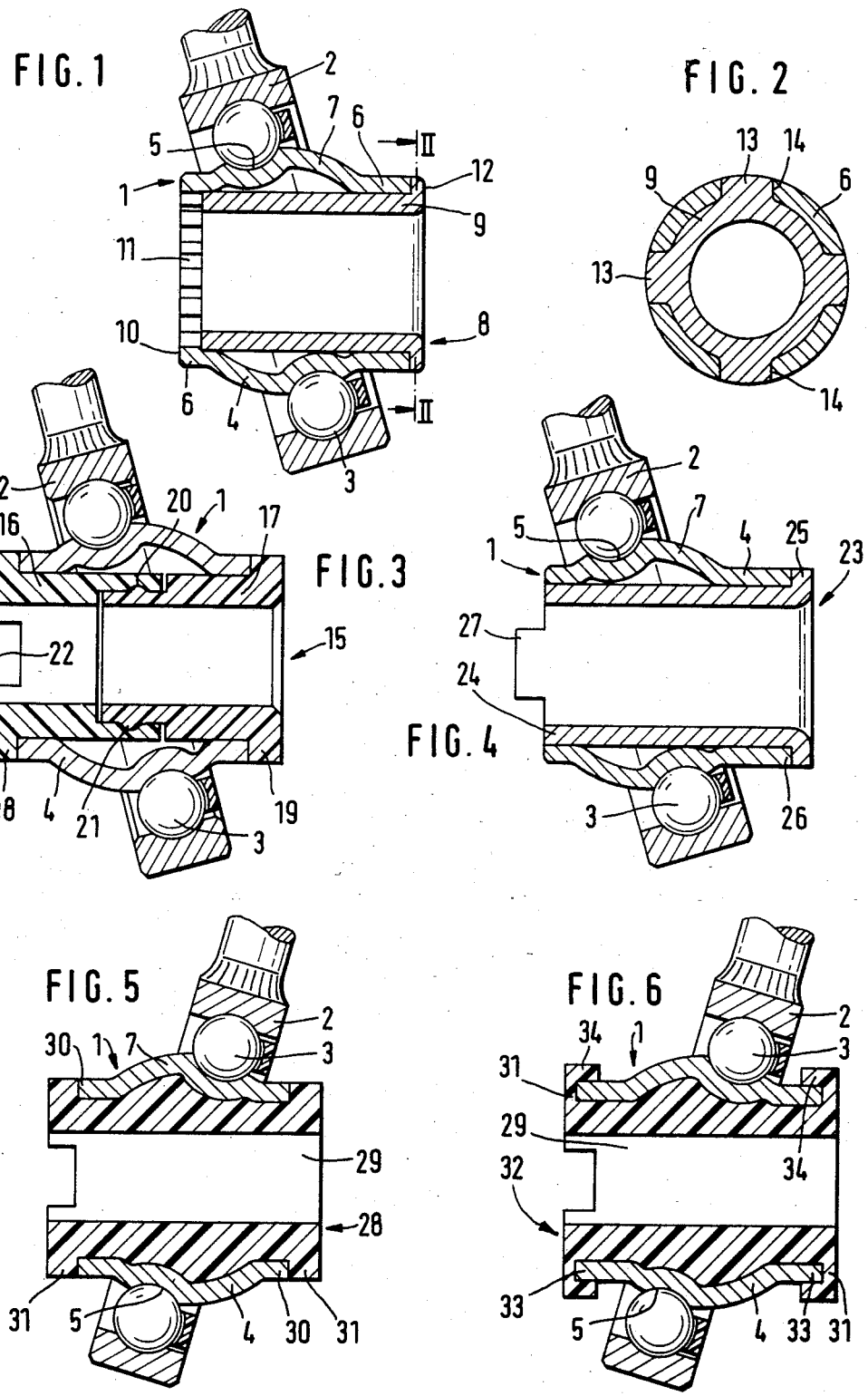

INNER RACE FOR A SWASHPLATE MECHANISM

STATE OF THE ART

Inner races for a swashplate mechanism comprising an inner race having on its outer surface a ball groove extending at an angle to its longitudinal axis and an outer race surrounding the inner race and having a ball groove formed in its bore, and a ring of balls rolling in the grooves of the two races are known and the swashplate mechanisms are used wherever a rotary movement has to be converted to a reciprocating movement, as is the case, for example, in drilling hammers, pad saws or ink distributor rollers. The disadvantage of the known constructions is that the inner race has to be produced by chip-removal and this is a very expensive procedure. One of the main reasons for this is that the ball groove for producing the swashplate movement extends at an angle to the longitudinal axis of the inner race.

OBJECTS OF THE INVENTION

It is an object of the invention to obviate the above disadvantages and to provide a swashplate mechanism inner race made from simple components for inexpensive manufacture.

This and other objects and advantages of the invention will become obvious from the following detailed description.

THE INVENTION

The novel inner race of the invention for a swashplate mechanism comprises an inner race having on its outer surface a ball groove extending at an angle to its longitudinal axis, an outer race surrounding the inner race and having a ball groove formed in its bore, and a ring of balls rolling in the grooves of the two races characterized in that the inner race is formed as a tubular sheet-metal element with a ball groove formed therein without metal removal and having a hub bush in its bore to receive a shaft.

The inner race formed as a tubular sheet-metal element with a ball groove formed therein without metal removal and having a hub bush in its bore to receive a shaft is particularly advantageous because, on the one hand, the ball groove inclined to the longitudinal axis can be formed in the sheet-metal component without any difficulty and on the other hand, the same element can be adapted to different shaft diameters and connected components by the hub bush.

In one embodiment of the invention, the hub bush may be in the form of a tubular metal element rigidly secured to the sheet-metal element and the said construction is made up simply of parts which are easily manufactured and is particularly inexpensive.

In one embodiment of the invention, the diameter of the sheet-metal element is smaller at its two end portions than at its central portion which creates a retaining zone to receive the hub bush at both ends of the sheet-metal component. In another embodiment of the invention to this end, the hub bush is connected to the sheet-metal element in the region of the end portions, the connection being non-positive by the bush being pressed into the element or being produced by the elements being joined together, e.g. by sticking, soldering, welding or the like. It is particularly advantageous if the sheet-metal element and the hub bush are secured against relative rotation by projections and recesses which interengage positively. It is thus possible to establish a secure connection between the sheet-metal element and the hub bush for every application.

In another embodiment of the invention, the hub bush has a radially outwardly extending flange at one end bearing against the end face of the sheet-metal element at one end which eliminates the need for additional fixing means in cases where the inner race is subjected to only unilaterally acting axial forces.

According to another variation of the invention, the hub bush consists of two tubular portions, each engaging by radial projections over the end face of the element at each axial end thereof, while the opposite ends of the tubular portions are constructed to interengage positively by a snap connection. This ensures a secure connection between the tubular portions, on the one hand, and the sheet-metal component on the other hand.

In one particularly advantageous embodiment of the invention, the hub bush is made of a polymer and a hub bush of this kind is easily manufactured by injection molding and can be connected to the sheet-metal element without difficulty. According to another aspect of the invention, the hub bush is formed by injecting or casting polymeric material into the bore of the sheet-metal element while keeping a bore concentric therewith clear. If required, the polymeric hub bush made may engage over the end faces of the sheet-metal element at each axial end by radially extending flanges. Alternatively, the polymeric hub bush may engage from outside radially around the end zones of the sheet-metal element by additional hollow cylindrical collars extending towards one another on the radially extending flanges which provides a secure connection in the end zones of the sheet-metal component despite the possibility of the polymer shrinking in the middle portion thereof.

Finally, according to the invention, the sheet-metal component and/or the hub bush has axially open recesses or axially extending projections on at least one end face to form a coupling with the shaft.

Referring now to the drawings:

FIG. 1 is a longitudinal section of a swashplate mechanism of the invention.

FIG. 2 is a cross-section along the line II—II of FIG. 1.

FIGS. 3 to 6 are longitudinal sections of other embodiments of swashplate mechanisms of the invention.

The swashplate mechanism consists of an inner race 1; an outer race 2 surrounding the same, and a ring of balls 3. Referring to FIG. 1, the inner race 1 is in the form of a tubular element 4 made from sheet-metal and having a ball groove 5 formed therein without metal removal, the diameter of the element 4 being smaller at its two end portions 6 than at it central portion 7. The bore of element 4 receives a hub bush 8 in the form of a tubular metal element 9 rigidly secured to element 4 by being pressed into the same. Element 4 has teeth 11 at the end face 10 for coupling with a shaft (not shown) and at its other end face 12, the metal element 9 has projections 13 which are clearer in FIG. 2 and which to secure against relative rotation engage positively in recesses 14 formed in the end part 6 of element 4.

FIG. 3 differs from this embodiment in respect to the construction of the hub bush 15 which, in this case, consists of two tubular portions 16 and 17 made from polymeric material each of which engages over the end face of each axial end of element 4 by radially extending projections 18 and 19. At the opposite ends, the tube portions 16 and 17 are provided respectively with a peripheral groove 20 and a bead 21 by which they engage positively. An axially open recess 22 is provided in this case in the element 4 and in the hub bush 15 for coupling to the shaft (not shown).

Referring to FIG. 4, the hub bush 23 is in the form of a tubular metal element 24 having at one end a radially outwardly extending flange 25 by which it bears against the end face of one end 26 of the element 4. The latter has an axially extending projection 27 in this case for coupling to the shaft (not shown).

In the embodiment shown in FIG. 5, the hub bush 28 is formed by injecting or casting a polymer into the bore of element 4 with a bore 29 concentric with element 4 being left clear. The hub bush 28 engages over element 4 at both axial ends 30 by radially extending flanges 31.

Finally, FIG. 6 is a modification of FIG. 5 showing a hub bush 32 engaging radially from outside around element 4 in its end zones 33 by means of additional collars 34 of hollow cylindrical configuration formed on the radially extending flanges 31 and extending towards one another.

Various modifications of the races of the invention may be made without departing from the spirit or scope thereof and it is to be understood that the invention is intended to be limited only as defined in the appended claims.

What we claim is:

1. In a swashplate mechanism comprising an inner race having on its outer surface a ball groove extending at an angle to its longitudinal axis and an outer race surrounding the inner race and having a ball groove in its bore and a ring of balls rolling in the grooves of the inner and outer races, the improvement comprising the inner race is formed as a tubular sheet-metal element with a ball groove formed without metal removal, the sheet-metal element having substantially constant wall-thickness over its entire length, and being smaller at its two end portions than at its central portion, the inner race being provided with a hub bush in its bore to receive a shaft, the hub bush being connected to the sheet-metal element in the area of its end portions, the hub bush having a radially outwardly extending flange at least at one end bearing against the end face of the sheet-metal element.

2. The inner race of claim 1 wherein the hub bush is a tubular metal element rigidly secured to the sheet-metal element.

3. An inner race of claim 1 wherein the connection of the hub bush to the sheet-metal element is non-positive by the bush being pressed into the sheet-metal element or by joining the two together.

4. An inner race of claim 1 wherein the sheet-metal element and the hub bush are secured against relative rotation by projections and recesses which positively inter-engage.

5. An inner race of claim 1 wherein the hub bush consists of two tubular portions, each engaging by radial projections over the end face of the sheet-metal element at each axial end thereof and the opposite ends of the tubular portions being positively inter-engaged by a snap connection.

6. An inner race of claim 1 wherein the hub bush is made of polymeric material.

7. The inner race of claim 6 wherein the hub bush is formed by injecting or casting polymeric material into the bore of the sheet-metal element while maintaining clear a bore concentric therewith.

8. The inner race of claim 7 wherein the polymeric hub bush engages over the end faces of the sheet-metal element at each axial end by radially extending flanges.

9. An inner race of claim 8 wherein the polymeric hub bush engages externally radially around the end zones of the sheet-metal element by additional hollow cylindrical collars extending towards one another on the radially extending flanges.

10. An inner race of claim 1 wherein the sheet-metal element and/or the hub bush has axially open recesses or axially extending projections on at least one end face to form a coupling with the shaft.

* * * * *